March 2, 1965  V. G. KRENKE  3,171,595
CONTROLS FOR AIR HEATING SYSTEMS
Filed March 9, 1962  2 Sheets-Sheet 2

Inventor:
Vincent G. Krenke,
by Robert J. Palmer
Attorney

United States Patent Office 3,171,595
Patented Mar. 2, 1965

3,171,595
CONTROLS FOR AIR HEATING SYSTEMS
Vincent G. Krenke, Carnegie, Pa., assignor to Westinghouse Electric Corporation, East Pittsburgh, Pa., a corporation of Pennsylvania
Filed Mar. 9, 1962, Ser. No. 178,679
11 Claims. (Cl. 236—9)

This invention relates to controls for air heating systems.

An air heating system of the gas furnace type usually has a room thermostat of the make-break contact type which energizes and deenergizes a solenoid which opens and closes respectively, a fuel supply valve; usually has a bonnet thermostat of the make-break contact type, in the hottest portion of the furnace, which deenergizes a solenoid which turns off the fuel supply valve when excessive temperatures occur; usually has another bonnet or plenum chamber thermostat of the make-break contact type which turns on and off or adjusts the speed of the motor which drives the fan for circulating the heated air; usually has a thermoelectric generator exposed to the flame of a pilot light which operates a relay having contacts of the make-break type, to turn off the fuel supply valve and the fan motor when the pilot light is extinguished, and sometimes has an outdoor thermostat of the make-break contact type which adjusts the heat anticipating resistor of the indoor thermostat when outdoor temperature changes. If such thermostats are sensitive ones, each requires a relay of the make-break contact type. The contacts of such thermostats and relays are subject to erosion through arcing and exposure to dust, and have to be serviced frequently if their effectiveness is to be maintained.

This invention uses solid-state devices such as thermistors and transistors for controlling such a system. Such solid-state devices have no contacts, and have relatively long, maintenance-free lives.

An object of this invention is to increase the lives of the controls of heating systems.

Another object of this invention is to decrease the servicing of controls of heating systems.

Figure 1:
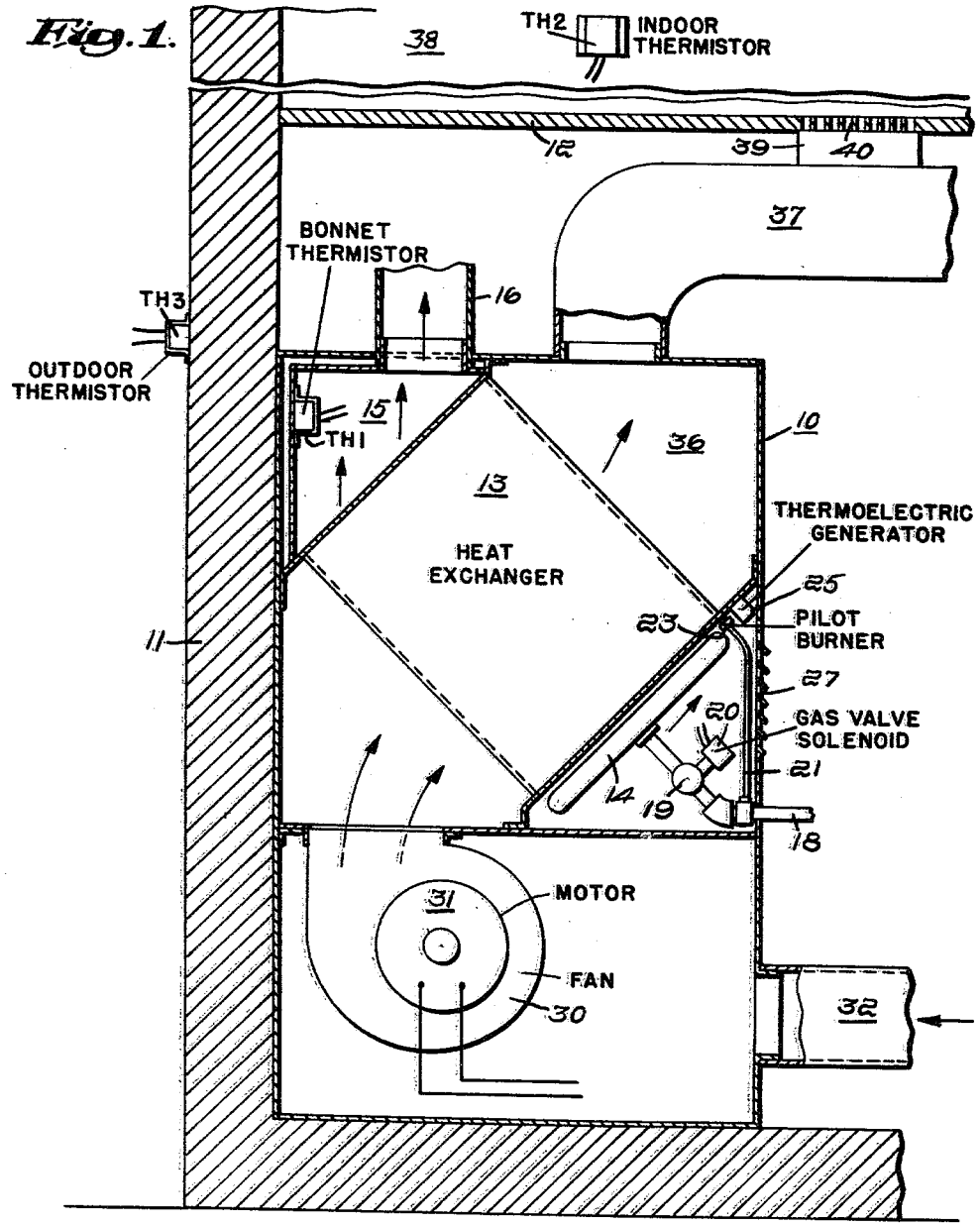
Figure 2:
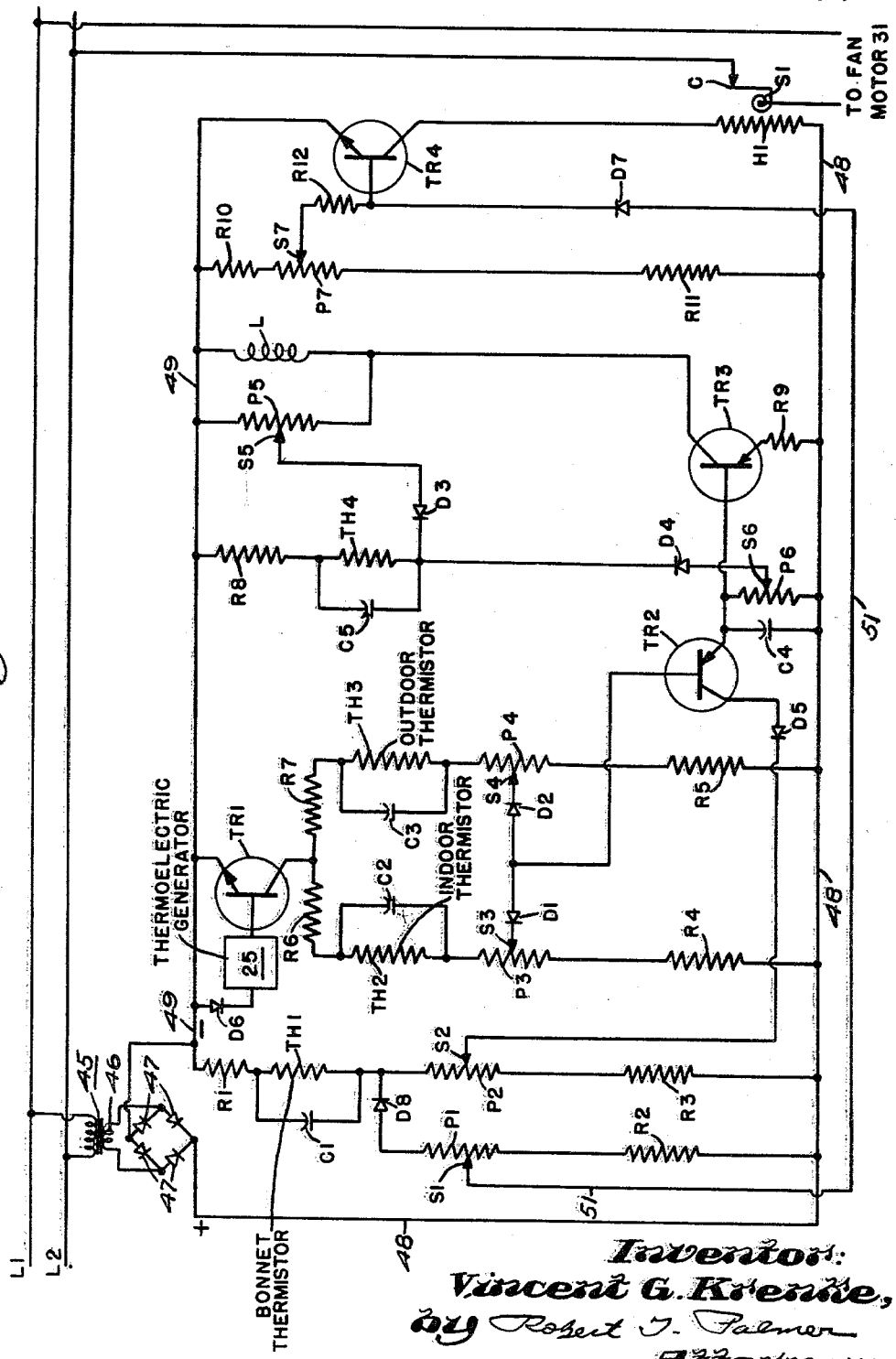

This invention will now be described with reference to the annexed drawings, of which:

FIG. 1 is a fragmentary side view, in section, of a residence equipped with a gas-fired, warm air heating system embodying this invention, and FIG. 2 is a circuit schematic of the controls of FIG. 1 connected to their circuit components.

Referring first to FIG. 1, a conventional warm air furnace 10 is supported in the cellar of a house having an external wall 11, and an internal floor 12. The furnace 10 has a conventional heat exchanger 13 containing finned tubes which are not shown, and through which heated gases from gas burner 14 pass. After leaving the heat exchanger, the flue gases pass into bonnet 15 of the furnace, and pass from the bonnet through duct 16 to a chimney which is not shown.

A gas supply pipe 18 is connected through valve 19 to the burner 14, and is opened and closed by a solenoid 20. The solenoid 20 has a winding L shown on FIG. 2. The pipe 18 is connected by a tube 21 to a pilot light unit 23 which projects flame against a thermoelectric generator 25. The wall of the furnace opposite the burner 14 has an inlet 27 for combustion air.

A fan 30 driven by an electric motor 31, draws air from a return air duct 32, and forces such air around the exteriors of the tubes of the heater exchanger 13, into a plenum chamber 36 from which it passes through a supply duct 37 into a room 38 of the house, each room having a branch duct 39 connected to the duct 37 and to a floor grille 40.

A thermistor TH2 acting as an indoor thermostat, is supported at a suitable level within the room. Another thermistor TH1 is supported within the bonnet 15 of the furnace, and acts as a bonnet thermostat. Another thermistor TH3 is supported on the exterior side of the building wall 11, and acts as an outdoor thermostat. The thermistors TH1, TH2 and TH3 preferably are semiconductors having positive temperature coefficients of resistance, such as PbSe, $BaTiO_3$, or single crystal silicon. The resistances of such thermistors increase rapidly above selected, critical temperatures to which they are heated.

Referring now to FIG. 2, a step-down transformer 45 has its primary winding connected to electric supply lines L1 and L2, and has a 24 volt secondary winding 46 connected to diodes 47 in a conventional bridge circuit so as to supply D.C. to positive bus 48 and to negative bus 49. Connected in series to the busses 48 and 49 are current limiting resistor R1, the thermistor TH1 shunted by capacitor C1, potentiometer P1, diode D8 and current limiting resistor R2. The resistor R1 and the thermistor TH1 are also connected in series with potentiometer P2 and current limiting resistor R3 to the busses 48 and 49.

The slider S1 of the potentiometer P1 is connected through wire 51 and blocking diode D7 to the base of NPN type transistor TR4, and through current limiting resistor R12 to slider S7 of potentiometer P7. A bias current circuit for the transistor TR4 is formed by the potentiometer P7 connected in series with current limiting resistors R10 and R11 to the busses 48 and 49. The emitter of the transistor TR4 is connected to the negative bus 49, and its collector is connected through heater resistor H1 to the positive bus 48. The resistor H1 is heated when the transistor TR4 conducts, and heats bimetallic switch S1 causing it to close its contacts C which connect the fan motor 31 to the supply lines L1 and L2.

The thermoelectric generator 25 is connected through blocking diode D6 to the bus 49, and to the base of NPN type transistor TR1, the emitter of which is connected to the bus 49, and the collector of which is connected to the junction of series-connected resistors R6 and R7. The collector of the transistor TR1 is connected through the resistor R6, the indoor thermistor TH2, shunted by capacitor C2, potentiometer P3 and current limiting resistor R4 to the positive bus 48, and is connected through the resistor R7, the outdoor thermistor TH3, potentiometer P4 and current limiting resistor R5 to the bus 48.

The slider S3 of the potentiometer P3 is connected through oppositely poled diodes D1 and D2 to the slider S4 of the potentiometer P4. The junction of the diodes D1 and D2 is connected to the base of PNP type transistor TR2, the collector of which is connected through blocking diode D5 to the slider S2 of the potentiometer P2, and the emitter of which is connected to the base of PNP type transistor TR3, and through potentiometer P6, shunted by capacitor C4, to the bus 48. Slider S6 of the potentiometer P6 is connected through blocking diode D4, thermistor TH4, shunted by capacitor C5, and current limiting resistor R8 to the negative bus 49.

The emitter of the transistor TR3 is connected through current limiting resistor R9 to the positive bus 48, and its collector is connected through the winding L of the gas burner valve solenoid 20 to the negative bus 49. The junction of the diode D4 and the thermistor TH4 is connected through blocking diode D3 to slider S5 of the potentiometer P5, one end of the latter being connected to the negative bus 49, and its other end being connected to the junction of the winding L and the collector of the transistor TR3.

Current will flow through the transistor TR1 if the thermoelectric generator 25 has been heated by flame from the pilot burner 23 sufficiently to cause current flow through the base and collector of the transistor TR1.

When the transistor TR1 conducts, current flows from the positive bus 48 through the resistor R4, the potentiometer P3, the thermistor TH2, the resistor R7 and the transistor TR1, and through the resistor R5, the potentiometer P4, the thermistor TH3, the resistor R7 and the transistor TR1, to the negative bus 49. The diodes D1 and D2 prevent parallel cross currents from flowing through the resistors R4 and R5. Voltages appear across the potentiometers P3 and P4, and paths are established for the flow of current from the base of the transistor TR2 through the diode D1 to the slider S3, and through the diode D2 to the slider S4.

The thermistor TH4 is a semiconductor similar to the thermistors previously described, but instead of being heated by a rise in the temperature of the air to which it is exposed, it is heated by the electric current flowing through it.

The thermistor TH1 instead of being located within the bonnet of the furnace, could be located within the plenum chamber 36 or in any other location where it responds to heat from the furnace.

The potentiometer P1 has its slider S1 set at a position corresponding to the temperature at which the fan motor 31 is to be turned on by the thermistor TH1 and the transistor TR4. The potentiometer P3 has its slider S3 set at a position corresponding to the indoor temperature to be maintained. The potentiometer P4 has its slider S4 set at a position corresponding to the outdoor temperature at which heat is to be turned on. The potentiometer P5 has its slider S5 set to control the voltage across the thermistor TH4 supplied from the winding L. The potentiometer P6 has its slider S6 set to control the bias current from the transistor TR3 to the thermistor TH4. The potentiometer P7 has its slider S7 set to control the current flowing through the heater H1.

Assume that power is turned on when all temperatures are such that no heat is required from the furnace. Current flows from the positive bus 48 through the resistor R2, potentiometer P1, diode D8, thermistor TH1 and resistor R1, and through the resistor R3, the potentiometer P2, the thermistor TH1 and the resistor R1, to the negative bus 49. Thus, voltages appear across the potentiometers P1 and P2, and paths are established for the flow of current from the slider S1 through the diode D7 to the base of the transistor TR4, and from the collector of transistor TR2 through the diode D5 to the slider S2.

If the pilot burner is extinguished, the temperature of the thermoelectric generator is reduced to ambient, and no voltage difference of the correct polarity for conduction appears between the base and the collector of the transistor TR1 which then becomes a current blocking member preventing the transistor TR3 from supplying energizing current to the winding L of the solenoid 20 of the gas valve 19 to open the latter.

A bias current circuit for the transistor TR3 is formed by the potentiometer P6, the slider S6, the diode D4, the thermistor TH4 and the resistor R8 connected in series between the busses 48 and 49. This is a fuel cycling control circuit. The value of these components is such that when the transistor TR3 is in a blocking condition, the bias current flow through its emitter to its base is insufficient to cause sufficient conduction of the transistor TR3 to energize the solenoid winding L. Cycling of the winding L occurs when the transistor TR3 conducts normally under control of the transistor TR2 as will be described later. Where the transistor TR3 conducts normally, its increased current causes a higher voltage across the winding L, and across the thermistor TH4 from the winding L through the potentiometer P5, the slider S5, the diode D3. The thermistor TH4 then begins to heat and increases its resistance to the point where lower bias current flows through the emitter to the base of the transistor TR3, reducing the conduction of the transistor TR3, which in turn, reduces the voltage across the thermistor TH4 which then cools and recycles the transistor TR3. The diode D2 prevents bias current from flowing through the potentiometer P5 and the winding L.

The operation of the transistor TR3 is controlled through the transistor TR2 by the indoor thermistor TH2, the outdoor thermistor TH3 and the bonnet thermistor TH1. Its base current for normal conduction is the sum of that caused by conduction of the transistor TR2 and that resulting from the flow through the thermistor TH4 in the previously described bias current circuit. Assume that the indoor temperature has dropped to the point that the resistance of the thermistor TH2 decreases, and increases the base current flowing through the diode D1, the slider S3, the potentiometer P5, the thermistor TH2, the resistor R6 and the transistor TR1, which, in turn, increases the base current of the transistor TR3. The transistor TR3 then conducts sufficiently to energize the winding L of the gas valve solenoid 20 so that the gas valve 19 opens. The temperature within the bonnet of the furnace increases, and the resistance of the thermistor TH1 increases. This causes the voltage between the emitter and the base of the transistor TR4 to increase so that the transistor TR4 conducts and supplies sufficient current to heat the heater resistor H1 to cause it to heat the bimetal switch S1 sufficiently to cause it to close its contacts and start the fan motor 31.

As the temperature at the thermistor TH1 increases, it may reach a point sufficient to cause the resistance of the thermistor TH1 to increase sufficiently to reduce current flow from the collector of the transistor TR2 through the diode D5, the slider S2, and the potentiometer P2, and to reduce conduction of the transistor TR3 to the extent that cycling of the winding L is reduced, and the on time of the gas valve is reduced. If the temperature at the thermistor TH1 should become excessive, its resistance would increase to the point that conduction of the transistor TR3 would be so reduced that it could not energize the winding L. The gas valve would then close and remain closed until the temperature at the thermistor TH1 was reduced.

The outdoor thermistor TH3 changes the effective setting of the indoor thermistor TH2 since the resistance path in which it is connected is one of the two similar resistance paths to the base of the transistor TR2. A sudden drop in outdoor temperature would cause the resistance of the thermistor TH3 to decrease, and to increase the current from the base of the transistor TR2 through the diode D2, the slider S4 and the potentiometer P4, which would, inturn, increase the base current of the transistor TR3, causing it to energize the winding L to prematurely open the gas valve.

What is claimed is:

1. In a space heating system including a hot air furnace having an air heating exchanger, having a motor driven fan for moving air over said heat exchanger and into said space, and having fuel burning means including a fuel valve for heating said exchanger, the combination of means including a first transistor for controlling said valve, means including a second transistor for controlling the conduction of said first transistor, means including first means responsive to the temperature of said space for controlling the conduction of said second transistor, means including a third transistor for energizing the motor of said fan, and means including second means responsive to the temperature of said exchanger for controlling the conduction of said second and third transistors, said first and second means having electrical resistances which vary with temperature.

2. In a space heating system including a hot air furnace having an air heating heat exchanger, having a motor driven fan for moving air over said exchanger and into said space, having fuel burning means including a fuel supply valve for heating said exchanger, and having a thermoelectric generator exposed to flame from said burning means, the combination of means including a first transistor for controlling said valve, means including a second transistor for controlling the conduction of said first transistor, means including said generator for controlling the conduction of said second transistor, means including first means responsive to the temperature of said space for controlling the conduction of said second transistor, means including a third transistor for controlling the motor of said fan, and means including second means responsive to the temperature of said exchanger for controlling the conduction of said second and third transistor, said first and second means having electrical resistances which vary with temperature.

3. In a space heating system including a hot air furnace having an air heating heat exchanger, having a motor driven fan for moving air over said exchanger and into said space, having fuel burning means including a fuel supply valve for heating said exchanger, and having a thermoelectric generator exposed to flame from said burning means, the combination of means including a first transistor for controlling said valve, means including a second transistor for controlling the conduction of said first transistor, means including first means responsive to the temperature of said space for controlling the conduction of said second transistor, means including a third transistor for controlling the motor of said fan, means including second means responsive to the temperature of said exchanger for controlling the conduction of said second and third transistors, means including a fourth transistor for controlling the conduction of said second transistor, and means including said generator for controlling the conduction of said fourth transistor, said first and second means having electrical resistances which vary with temperature.

4. In a space heating system including a hot air furnace having an air heating heat exchanger, and having fuel burning means including a fuel supply valve for heating said exchanger, said valve having a solenoid for adjusting said valve, said solenoid having an energizing winding, the combination of means including a first transistor for energizing said winding, said last mentioned means including a bias current circuit for said transistor, said circuit including a thermistor having an electrical resistance which increases with an increase in its temperature caused by an increase in the electrical current flowing through it, and including means for flowing through said thermistor current proportional to the current flowing through said winding, means including a second transistor for controlling the conduction of said first transistor and means including means responsive to the temperature of said space and having an electrical resistance which varies with temperature for controlling the conduction of said second transistor.

5. In a space heating system including a hot air furnace having an air heating heat exchanger, and having fuel burning means including a fuel supply valve for heating said exchanger, said valve having a solenoid for adjusting said valve, said solenoid having an energizing winding, the combination of means including a first transistor for energizing said winding, said last mentioned means including a bias current circuit for said transistor, said circuit including a thermistor having an electrical resistance which increases with an increase in its temperature caused by an increase in the electrical current flowing through it and including means for flowing through said thermistor current proportional to the current flowing through said winding, means including a second transistor for controlling the conduction of said first transistor and means including first means responsive to the temperature of said space for controlling the conduction of said second transistor, said means for controlling the conductivity of said second transistor also including second means responsive to the temperature of said exchanger, said first and second means having electrical resistances which vary with temperature.

6. In a space heating system including a hot air furnace having an air heating heat exchanger, having fuel burning means including a fuel supply valve for heating said exchanger, and having a thermoelectric generator exposed to flame from said burning means, said valve having a valve adjusting solenoid, said solenoid having an energizing winding, the combination of means including a first transistor for energizing said winding, said last mentioned means including a bias current circuit for said transistor, said circuit including a thermistor having an electrical resistance which increases with an increase in its temperature caused by an increase in the current flowing through it and including means for flowing through said thermistor current proportional to the current flowing through said winding, means including a second transistor for controlling the conduction of said first transistor, means including a third transistor for controlling the conduction of said second transistor, means including said generator for controlling the conduction of said third transistor, and means including means responsive to the temperature of said space and having an electrical resistance which varies with temperature for controlling the conduction of said second transistor.

7. In a space heating system including a hot air furnace having an air heating heat exchanger, having fuel burning means including a fuel supply valve for heating said exchanger, and having a thermoelectric generator exposed to flame from said burning means, said valve having a valve adjusting solenoid with an energizing winding, the combination of means including a first transistor for energizing said winding, said last mentioned means including a bias current circuit for said transistor, said circuit including a thermistor having an electrical resistance which increases with an increase in temperature caused by an increase in the current flowing through it and including means for flowing through said thermistor current proportional to the current flowing through said winding, means including a second transistor for controlling the conduction of said first transistor, means including a third transistor for controlling the conduction of said second transistor, means including said generator for controlling the conduction of said third transistor, means including first means responsive to the temperature of said space for controlling the conduction of said second transistor and means including second means responsive to the temperature of said exchanger for controlling the conduction of said second transistor, said first and second means having electrical resistances which vary with temperature.

8. In a space heating system including a hot air furnace having an air heating heat exchanger, having a motor driven fan for moving air over said exchanger and into said space, having fuel burning means including a fuel supply valve for heating said exchanger, and having a thermoelectric generator exposed to flame from said burning means, said valve having a valve adjusting solenoid with an energizing winding, the combination of means including a first transistor for energizing said winding, said last mentioned means including a bias current circuit for said transistor, said circuit including a thermistor having an electrical resistance which increases with an increase in temperature caused by an increase in current flowing through it and including means for flowing through said transistor current proportional to the current flowing through said winding, a second transistor for controlling the conduction of said first transistor, a third transistor for controlling the conduction of said second transistor, means including said generator for controlling the conduction of said third transistor, first means including means responsive to the temperature of said space for controlling the conduction of said second transistor, means including a fourth transistor for energizing the motor of said fan, and second means responsive to the temperature of said space for controlling the conduction of said second and fourth transistors, said first and second means having electrical resistances which vary with temperature.

9. In a space heating system including a hot air furnace having an air heating exchanger, having fuel burning means including a fuel valve for heating said exchanger, and having a thermoelectric generator heated by flame from said fuel burning means, the combination of means including a first transistor for controlling said valve, means including a second transistor for controlling the conduction of said first transistor, a third transistor controlled by said generator, and means including said third transistor for controlling the conduction of said second transistor, said means for controlling the conduction of said second transistor further including means responsive to the temperature of said space and having an electrical resistance which varies with temperature, said means for controlling the conduction of said second transistor also including a pair of D.C. supply connections, said third transistor and said means responsive to temperature being connected in series to said connections.

10. In a space heating system including a hot air furnace having an air heating heat exchanger, having fuel burning means including a fuel valve for heating said heat exchanger, and having a thermoelectric generator heated by flame from said fuel burning means, the combination of means including a first transistor for controlling said valve, means including a second transistor for controlling the conduction of said first transistor, a third transistor controlled by said generator, and means including said third transistor for controlling the conduction of said second transistor, said means for controlling the conduction of said second transistor further including first means responsive to the temperature of said space and having an electrical resistance which varies with temperature and further including second means responsive to the temperature of said exchanger and having an electrical resistance which varies with temperature, said means for controlling the conduction of said second transistor also including a pair of D.C. supply connections, said third transistor and said first means being connected in series to said connections.

11. In a space heating system including a hot air furnace having an air heating heat exchanger, having fuel burning means including a fuel valve for heating said exchanger, and having a thermoelectric generator heated by flame from said burning means, the combination of a first transistor for controlling said valve, means including a second transistor for controlling the conduction of said first transistor, a third transistor, means including said generator for controlling the conduction of said third transistor, and means including said third transistor for controlling the conduction of said second transistor, said means for controlling the conduction of said second transistor further including a thermistor having a positive coefficient of resistance responsive to the temperature of said space, said means for controlling the conduction of said second transistor also including a pair of D.C. supply connections, said third transistor and said thermistor being connected in series to said connections.

References Cited in the file of this patent

UNITED STATES PATENTS

| | | |
|---|---|---|
| 2,225,700 | Laing | Dec. 24, 1940 |
| 2,467,425 | Cobb | Apr. 19, 1949 |
| 2,535,133 | Hoch | Dec. 26, 1950 |
| 2,954,530 | Haskell | Sept. 27, 1960 |
| 2,975,260 | Carlson | Mar. 14, 1961 |
| 3,038,106 | Cutsogeorge | June 5, 1962 |
| 3,050,257 | Sweger et al. | Aug. 21, 1962 |
| 3,057,557 | Guyton et al. | Oct. 9, 1962 |
| 3,074,410 | Foster | Jan. 22, 1963 |

FOREIGN PATENTS

| | | |
|---|---|---|
| 1,213,351 | France | Oct. 26, 1959 |

UNITED STATES PATENT OFFICE
CERTIFICATE OF CORRECTION

Patent No. 3,171,595 March 2, 1965

Vincent G. Krenke

It is hereby certified that error appears in the above numbered patent requiring correction and that the said Letters Patent should read as corrected below.

Column 6, line 70, for "space" read -- exchanger --.

Signed and sealed this 5th day of October 1965.

(SEAL)
Attest:

ERNEST W. SWIDER
Attesting Officer

EDWARD J. BRENNER
Commissioner of Patents